United States Patent [19]

Blanz

[11] Patent Number: 4,725,221
[45] Date of Patent: Feb. 16, 1988

[54] IMPROVED MACHINE FOR CONTINUOUSLY PRODUCING AN ELEMENT OF A SEPARABLE FASTENER

[75] Inventor: John H. Blanz, Carlisle, Mass.

[73] Assignee: John H. Blanz Company, Inc., Carlisle, Mass.

[21] Appl. No.: 867,328

[22] Filed: May 23, 1986

[51] Int. Cl.[4] ............................................ B29C 45/04
[52] U.S. Cl. ...................................... 425/575; 24/452; 264/328.8; 264/328.11; 425/376 R; 425/814
[58] Field of Search .............. 425/134, 257, 259, 545, 425/574–576, 542, 376 A, DIG. 227, 376 R; 264/328.8, 328.11; 24/452

[56] References Cited

U.S. PATENT DOCUMENTS

| | | | |
|---|---|---|---|
| 3,314,112 | 4/1967 | Hardcastle | 425/576 X |
| 3,412,432 | 11/1968 | Fuglsang-Madsen | 425/575 |
| 3,590,109 | 6/1971 | Doleman et al. | 264/328.11 X |
| 3,752,619 | 8/1973 | Menzin et al. | 425/576 X |
| 3,758,657 | 9/1973 | Menzin et al. | 264/166 |
| 3,762,000 | 10/1973 | Menzin et al. | 24/452 |
| 3,915,608 | 10/1975 | Hujik | 425/134 X |
| 4,050,873 | 9/1977 | Brumlik et al. | 425/575 X |
| 4,140,465 | 2/1979 | Koshkin et al. | 425/574 X |
| 4,501,549 | 2/1985 | Abramov et al. | 425/542 |
| 4,600,550 | 7/1986 | Cloren | 425/376 A X |

Primary Examiner—Richard L. Chiesa
Attorney, Agent, or Firm—Weingarten, Schurgin, Gagnebin & Hayes

[57] ABSTRACT

An improved machine for the continuous production of a separable fastening element includes an endlessly-circulating belt of molding modules that, in the preferred embodiment, cyclically pass by at least two injection heads and two removal-wheels once every revolution. Each injection head includes a single-pump-driven reservoir that feeds an injection and forming die operative to first form a backing layer, and then to form plural hook-like projections, by a wedge-like forcing action of a portion of the backing into hook-like mode cavities. The resulting ribbon then cures and includes the hook-like elements standing off of and integral with the backing. The modules include interdigited mold and spacer plates that are each of a generally-rectangular configuration and that together are cooperative to define releasable hook-like forming cavities and a smooth backing-forming two-dimensional surface. First and second molding module alignment means are disclosed for selectively abutting and separating the confronting longitudinal edges of adjacent molding modules to provide ribbon formation and removal respectively. The mold cavities may be engraved into the mold plates alone or into both the spacer and the mold plates, to selectively provide different thickness and geometry hooks having correspondingly different elastic/plastic properties. The mold cavities have rounded wall surfaces that facilitate the release of the hooks formed thereby.

15 Claims, 20 Drawing Figures

IMPROVED MACHINE FOR CONTINUOUSLY PRODUCING AN ELEMENT OF A SEPARABLE FASTENER

FIELD OF THE INVENTION

This invention is directed to the field of article shaping, and more particularly, to an improved machine and method for continuously producing an element of a separable fastener.

BACKGROUND OF THE INVENTION

A well-known, and very useful, separable fastener, well-known as VELCRO, includes a first fastening element having fibers or other hook-engaging means and a second fastening element having plastic or other hook defining means. In the mated condition of the two fastening elements, the several hooks releasably engage the fibers in such a way that the fastening elements are separably fastened together.

Menzin et al, in U.S. Pat. Nos. 3,752,619, 3,758,657, 3,762,000, each incorporated herein by reference, disclose and claim machine, method, and separable fastening element that relate to this kind of separable fastener. The utility is limited, however, because there are several significant disadvantages associated with the Menzin et al technology.

A forming disk, mounted for rotation with a shaft, has a groove in its peripheral wall into which plural, circumferentially-spaced modules are received, with the generally radial edges of circumferentially-adjacent modules in abutting relation. Each module includes interdigited mold and spacer plates, and because of the abutting relation between the generally radial edges of the plates of adjacent modules, and further because the spacer plates need to move radially inward and outward, the position of the mold and of the spacer plates must be in an alternating relation in circumferentially-adjacent modules. The circumferential surfaces of the mold and spacer plates of the several modules are curved. As will be appreciated, the modules thus require very-precise, and costly, machining to both insure proper interleaving and close-fit at the radial interfaces so as to provide continuous, gap-free molding surfaces and effective ribbon release out of the mold cavity. By way of example, if the constitutive mold and spacer plates are out of tolerance of one or two thousands of an inch, the machine suffers severe performance degradation.

An injection head is provided proximate a point along the circumference of the forming disk. A first nozzle is provided in the injection head for injecting plastic material into hook-like cavities of the mold plates and a second, downstream injection nozzle is provided in the injection head for applying a backing layer of plastic backing to the plastic already injected into the hook-like cavities. First and second pumps are coupled to the first and second injection nozzles for forcing the plastic material into the mold cavities and onto the surface of the modules. But because the pumps must force the plastic material into the mold cavities, and onto the forming disk, the pumps must be operated at comparatively-high pessure. High-pressure pumps tend to wear and are consumed in proportion to the pump pressure, so that at the comparatively-high pressures actually employed, the pumps are periodically subject to premature failure. At such times, not only are significant materials and labor costs involved in pump replacement, but system throughput is interrupted, production is lost, and product revenue consequently is diminished.

Further disadvantages are associated with the way that only non-uniform hook patterns are provided on the ribbon as produced. The position of the mold plates and the spacer plates of circumferentially-adjacent modules are in alternating relation, so that in one module, for example, if the laterally outer plate is a mold plate and the next laterally inward plate is a spacer plate, in the circumferentially adjacent modules, the laterally outer plate is a spacer plate and the next plate adjacent thereto is a mold plate. The spacer plates of adjacent layers overlap and interleave at the generally radial interface of circumferentially-adjacent modules. Because of this radial interface interleaving the thickness of the spacer plates and mold plates in each module, and module to module, must be the same, so that the hooks of the ribbon, as produced by each given module, are non-uniformly spaced across the width of each module. Moreover, the hooks as formed in the alternating-position mold plates between circumferentially adjacent modules, are in laterally offset staggering relation, so that thereby the hooks are non-uniformly spaced module-to-module along the length of the produced ribbon. The non-uniform hook pattern, described above, presents special difficulties to downstream ribbon handling equipment. Because of this non-uniformity, for example, special plates must be manufactured to have ribs of such a very-small thickness that the ribs can be received between the non-uniformly positioned hooks along the length of the ribbon of separable fastening element. Not only are such precisely-machined ribbed plates expensive, but any slight intolerance in either plate or rib position mashes the hooks, which results in a degradation, if not a total spoilation, of the product integrity.

A further disadvantage, insofar as production is concerned, is that the prior art is only capable of producing a single ribbon of separable fastening element. Although it is conceivable that the Menzin et al forming disk and associated machinery could be increased in diameter and scale to accommodate two injection heads and two removal stations, it would not in fact be feasible either economically or practicably. Because of the tight tolerances required of the several mold and spacer plates of each of the modules, a scaled machine, of the size necessary to accommodate, for example, dual injectors and removal stations, would cost between a multiple of four and nine of the cost of the original machine, which cost is prohibitive.

SUMMARY OF THE INVENTION

The improved machine and method for continuously producing a separable fastening element of the present invention overcomes the above, and other, disadvantages associated with the heretofore known technology, and includes plural molding modules so interconnected and driven as to cyclically traverse a closed, generally-oval path. First and second injection heads and cooperative first and second removal-wheels are selectively positioned about the closed-path such that with every complete cycle two ribbons of separable fastening element are continuously produced. The improved machine and method of the present invention therewith provides a multiple-ribbon production capability with a corresponding multiplication of system throughput, and revenue.

Each of the injection heads has a single nozzle operative to continuously form the separable fastening element. The improved nozzle structure of each of the first and second injection heads includes an injection and forming die that is in fluid communication, via an elongated transition slot, with a single-pump-driven fluid reservoir. The die tapers, and in such a way that upstream regions thereof form the ribbon portion of the separable fastening element first and downstream portions thereof thereafter force a portion of the ribbon into the mold cavities by a wedging-like pressure action. Because the wedge-like action of the injection die itself provides a significant portion of the pressure necessary to force the plastic into the mold cavities, the single pump that is connected to each of the injection heads operates at a significantly lower pressure than has heretofore been possible. The present invention thus provides a materially enhanced pump life-time, and therewith achieves substantial pump replacement materials and labor savings, longer mean intervals between expected pump failures, and an improved system throughput.

Another advantage of the present invention is that the lateral dimensions of the mold and spacer plates in a given module, and module-to-module, can be selected to have different thickness dimensions, to selectively produce a variety of hook patterns. In this way, for example, spacer plate and mold plate thickness can be so selected to make a much more uniform hook pattern than has been heretofore possible. Again, the mold and spacer plates of adjacent modules can have plate thicknesses that vary from module to module, so that differential-hook-geometry separable fastening elements can thereby selectively be produced.

The molding modules of the present invention are substantially identical, so that the ribbon of flexible separable fastening element formed by the modules can have a uniform hook geometry along the direction of elongation of the ribbon. The uniform geometry of the hook-like projections is not only desirable in itself, but it relaxes the machining tolerances on downstream separable fastening element receiving and handling machines, which materially reduces costs and improves the yield of quality, undamaged product.

In accordance with further features of the present invention, each of the mold and spacer plates of the molding modules has a generally-rectangular geometry, adjacent modules have spacer and mold plates that occupy the same relative positions, and, since there is no interleaving at the radial interface, there is no wear at the interfaces between adjacent modules during mold opening and closing. The machining tolerances of the mold and spacer plates of the molding modules of the present invention are much-less-critical than that of the prior art and are thus capable of being readily economically manufactured.

BRIEF DESCRIPTION OF THE DRAWINGS

Other features and attendant advantages of the improved machine and method for continuously producing a separable fastening element according to the present invention will become apparent as the invention becomes better understood by referring to the following detailed description of the invention and to the drawings, wherein.

DETAILED DESCRIPTION OF THE INVENTION

Figure 1:
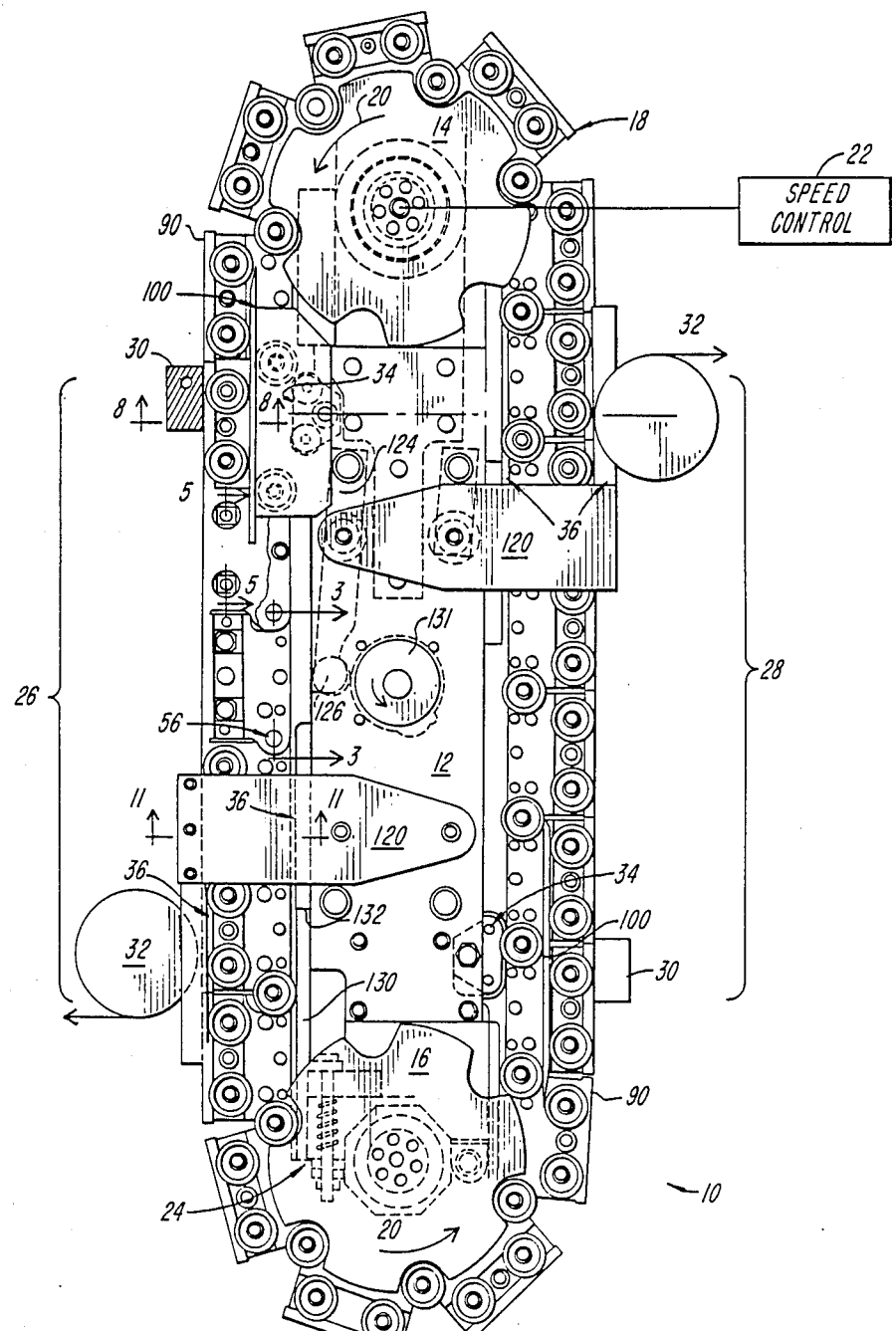
FIG. 1 is a side elevational view illustrating the improved machine and method for the continuous production of a separable fastening element according to the present invention.

Referring now to FIG. 1, generally designated at 10 is a side elevational view illustrating the improved machine and method for the continuous production of a separable fastening element according to the present invention. The machine 10 includes a generally-vertical, elongated frame member 12, a drive sprocket 14 mounted for rotation to one end of the elongated frame 12, and an idler sprocket 16 mounted for rotation to the other end of the frame 12. Plural modules generally designated 18 to be described are interconnected as an endless-belt and controllably circulated, preferably in a counter-clockwise direction as indicated by arrows 20, over the frame 12 and around the drive sprocket 14 and idler sprocket 16. The drive sprocket 14 is driven by a motor operatively coupled thereto. A speed control 22 is coupled to the motor for controlling the speed at which the plural modules 18 circulate about the frame 12. A tensioning mechanism generally designated 24 and illustrated in dashed outline is operatively coupled to the idler sprocket 16 to provide a selected tension in the endless-loop of plural, interconnected molding modules 18.

The height of the frame, and the length and number of the modules 18, are selected such that plural ribbons of separable fastening element are able to be continuously produced at any given time. In the preferred embodiment, the modules 18 are continuously circulated between two spacially separate identical production paths illustrated schematically by brackets 26, 28. The production paths 26, 28 each include an injection head generally designated 30 to be described and a spaced-apart ribbon-removal wheel 32 so spaced from the associated injection head 30 as to allow the material injected by the head 30 to cure the time it reaches the ribbon removal wheel 32 along the paths 26, 28. External cooling of the ribbon and modules may be employed to increase the output of the machine, as necessary. Molding module first alignment means generally designated 34 to be described are provided for bringing adjacent modules into abutting relationship proximate corresponding injection heads 30 along the two paths 26, 28, and molding module second alignment means generally designated 36 to be described are provided proximate the ribbon-removal wheels 32 along the several paths 26, 28 for slightly separating adjacent modules 18 at the time of spacer plate refraction and ribbon removal. Any suitable molding module alignment means 34 for bringing adjacent modules into close, gap-free abutting relation proximate the injection heads 30 may be employed, and any suitable molding module separation means 36 for allowing ribbon removal and for providing a slight gap between adjacent molding modules thereby preventing undesirable friction at the time of spacer plate retraction may be employed.

Figure 2:
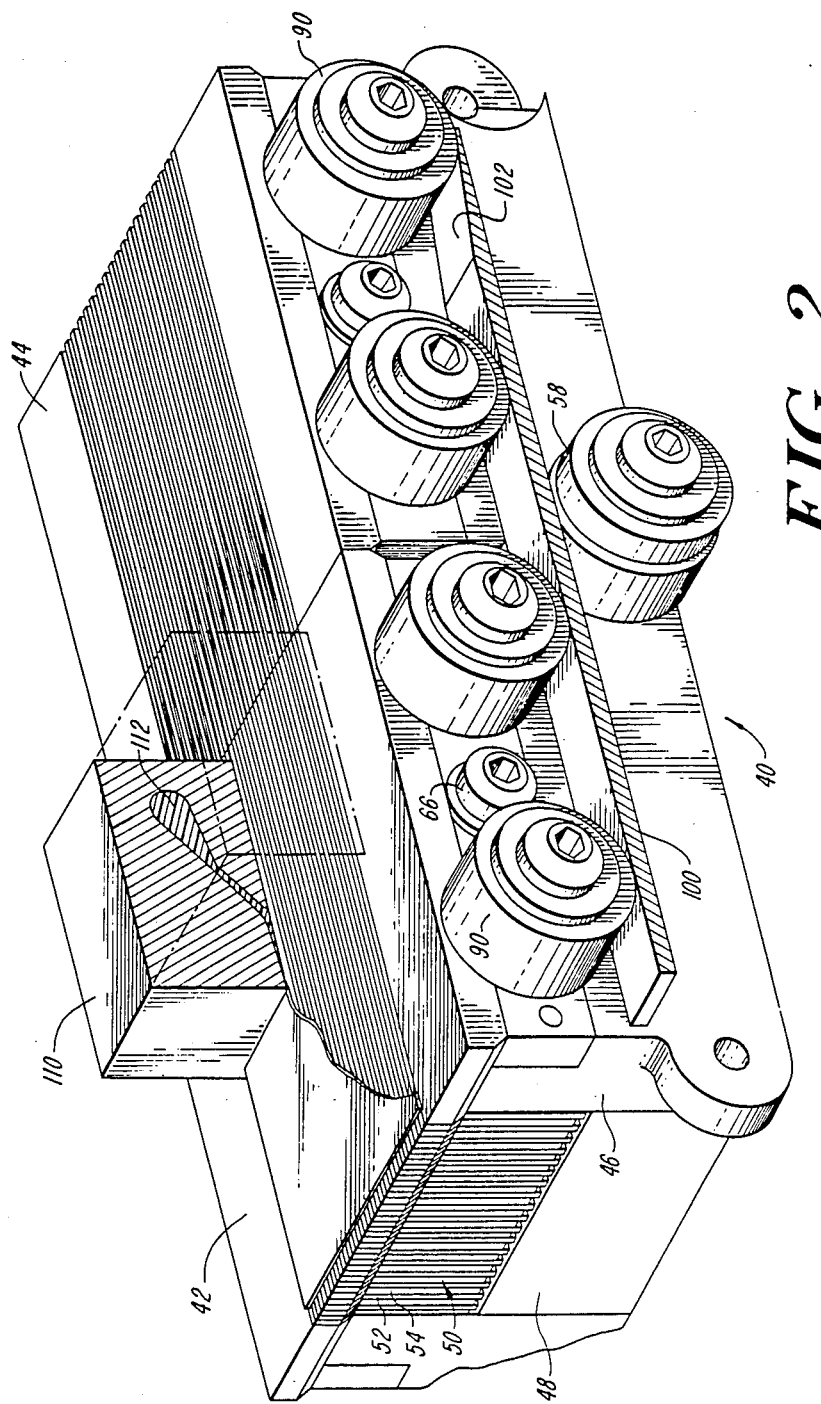
FIG. 2 is an enlarged perspective view illustrating a portion of the improved machine and method for the continuous production of a separable fastening element according to the present invention.
Figure 3:
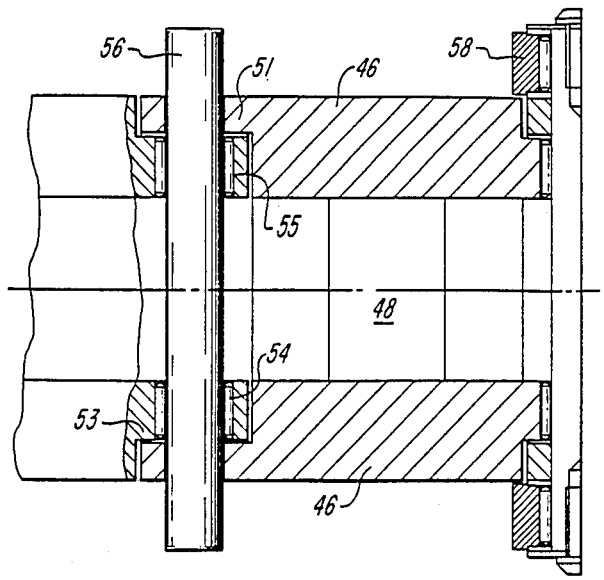
FIG. 3 is a sectional view along the line 3—3 of FIG. 1.

Referring now to FIG. 2, generally designated at 40 is a perspective view illustrating two adjacent molding modules 42, 44, at the site of the injection head and along either one of the two production paths 26, 28. Modules 42, 44 are substantially identical in construction, and each includes solid sideplates 46 interconnected by a solid cross plate 48. The plate 48 cooperates with the sideplates 46 to provide a cavity generally designated 50 into which are received mold plates 52 and spacer plates 54 in a manner to be described. As best seen in FIG. 3, at the longitudinal ends, the bottom corners of the side plates 46 of adjacent modules are provided with complimentary shoulder portions 51, 53 that are cooperative to provide bearing races 55. As shown in FIGS. 1 and 3, pivot pins 56 are slidably mounted in the bearing races 55 for pivotally coupling adjacent molding modules 42, 44 (FIG. 2) together into a closed endless-loop (FIG. 1).

Drive and alignment rollers 58 are mounted for rotation with the several shafts 56. The teeth of the drive sprocket 14 bear against the rollers 58 and cyclically move the endless-loop of molding modules through the production paths 26, 28. The rollers 58 are cooperative with the first and second module alignment means 34, 36 in a manner to be described to provide control of the state of the mold cavities of the modules during the various phases of production of the two ribbons of the separably fastening element.

Figure 4:
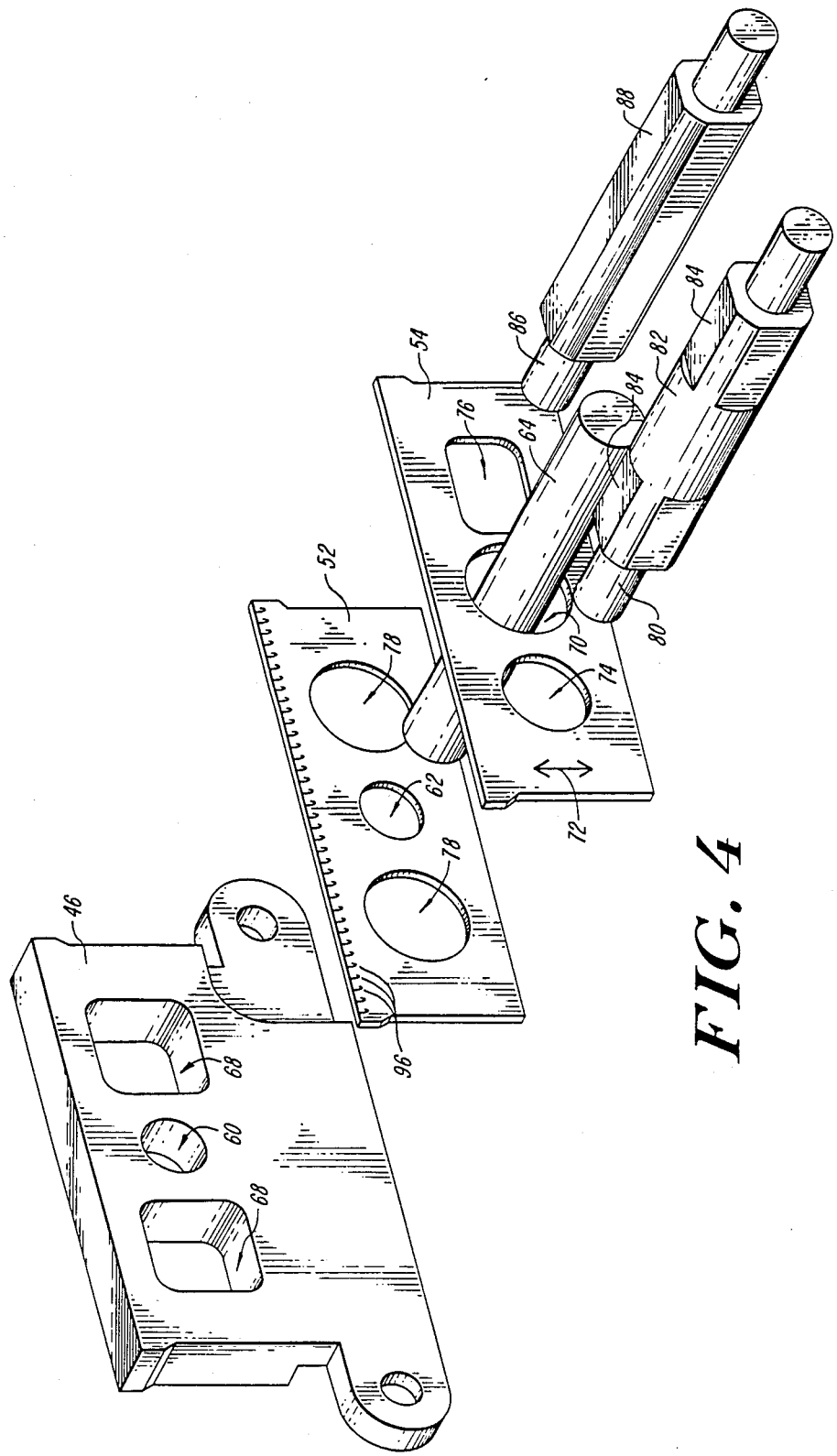
FIG. 4 is an exploded, perspective view illustrating a molding module of the improved machine and method for the continuous production of a separable fastening element according to the present invention.

Referring now to FIGS. 2 and 4, a plurality of generally-rectangular mold plates 52 and a plurality of spacer plates 54 are positioned in alternating relation in the cavity 50 of each of the molding modules. The side plates 46 have aligned, cylindrical apertures generally designated 60 centrally therethrough, each of the mold plates 52 has a central, cylindrical aperture generally designated 62 aligned with the apertures 60 in the sideplates 46, and a generally-cylindrical locking pin 64 is slidably received through the several co-axially aligned cylindrical apertures 60, 62. These apertures and this pin provide X, Y positional location of the several mold plates 52. The height dimension of the several mold plates 52, and the height dimension of the cavity 50, are selected to be substantially the same dimension, so that the plate 48 securely seats the several mold plates 52 in the cavity 50 and prevents their rotation about the axis of the locking pin 64. The mold plates 52 thereby are held stationary in precise X, Y orientation in the cavity 50. Fasteners 66 are provided on the extending ends on the pins 64 for removably fastening the pins to the molding modules.

Two rectangular apertures generally designated 68 are provided one to each side of the central aperture 60 in the sideplates 46 of each of the molding units. A cylindrical central aperture generally designated 70 is provided centrally through each of the several spacer plates 54. The diameter of the apertures 70 is selected to be larger than the diameter of the apertures 60, 62, so that the several spacer plates 54 have a clearance through which they can move vertically as illustrated by an arrow 72 relative to the locking pins 64. A cylindrical aperture generally designated 74 is provided to one side of the central aperture 70 and a rectangular aperture generally designated 76 is provided to the other side of the central aperture 70 of the several spacer plates 54. Two cylindrical apertures generally designated 78 are provided to either side of the central aperture 62 of the several mold plates 54. Th apertures 78 are larger than the apertures 74, 76 in the spacer plates. The apertures 78 are axially aligned with the apertures 74, 76 and are axially aligned with the rectangular apertures 68 in the sideplates 46.

A first shaft 80 having a generally-cylindrical central portion 82 and four end facets 84 in a rectangular cross-section to either side of the central, cylindrical portion 82 is slidably received through the aligned apertures 74, 78 of the several spacer and mold plates 52, 54 such that the central, generally-cylindrical portion 82 thereof confronts the apertures 74, 78 and the rectangular facets 84 thereof confront the generally-rectangular apertures 68 of the sideplates 46. The inside dimension of the apertures 74 and the outside dimension of the central portion 82 are selected such that the first shafts 80 provide X, Y positioning of the several spacer plates 54 in the mold cavity 50.

A second shaft 86 having four facets 88 in a generally rectangular cross-section is slidably received through the axially-aligned apertures 68, 76, 78. The rectangular cross-section defined by the facets 88 of the pin 86 and the rectangular cross-section of the apertures 76 of the several spacer plates 54 are selected such that the several spacer plates 54 are tightly-held top-to-bottom by the second pin 86 but in such a way as to allow lateral spacer plate expansion side-to-side.

Figure 5:
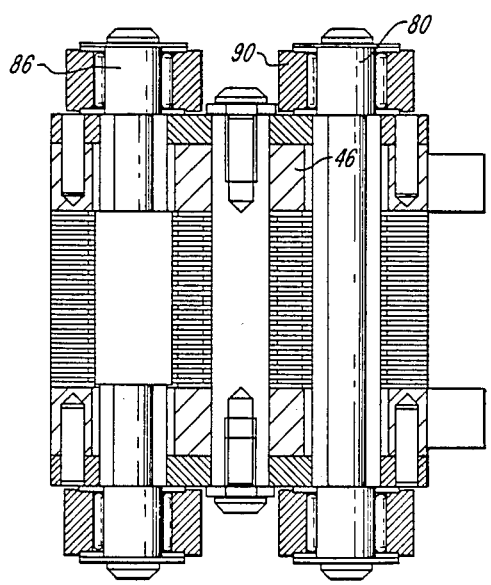
FIG. 5 is a sectional view along the line 5—5 of FIG. 1.

Wheels 90 are rotatably mounted to the extending ends of the second and the third shafts 80, 86 as best seen in FIG. 5. As appears below, the wheels 90 are cooperative in a manner to be described with the module first and second alignment means 34, 36 (FIG. 1) to maintain the modules in intended position for molding and for ribbon removal.

Figure 6A:
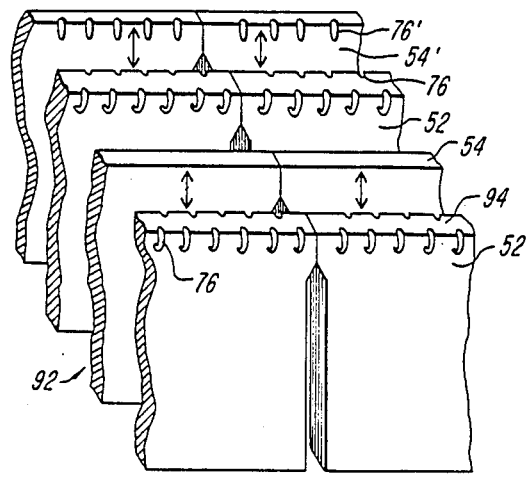
FIGS. 6A–6F show diagrams illustrating mold plate, spacer plate and hook-types of different embodiments of the molding modules of the improved machine and method for the continuous production of a separable fastening element according to the present invention.
Figure 6B:
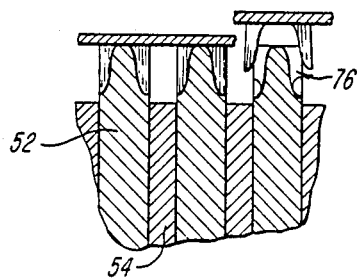

Referring now to FIG. 6A, generally designated at 92 is an exploded, broken-away perspective view illustrating the hook cavity construction of the several plates of each of the embodiments of the molding modules of the present invention. In one embodiment, each of the mold plates 52 have a generally-linear top edge 94, and have a plurality of spaced, hook-like cavities generally designated 76 linearly arrayed along, and to both sides of, the linear edge 94 at the top of the several mold plates 52, which cavities are recessed into the exposed lateral faces of the several mold plates 52. The mold plates, and the confronting, generally planar wall of adjacent spacer plates 54, define the several hook-like mold cavities 76, as best seen in FIG. 6B, such that when the modules are in position under the injection head the head confronts rows of parallel openings disposed in a regular 2×2 array on the top surface of the several molding modules.

Figure 6C:
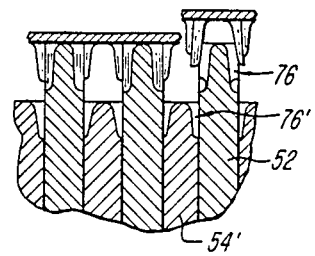

In another embodiment, the mold plates 52 are interdigited with spacer plates 54', again of a generally rectangular configuration, but which in this embodiment are themselves provided with mold cavities 76' confronting the mold cavities 76 of the mold plates 52, the cavities 70, 76' co-constituting the hook defining cavities as best seen in FIG. 6C.

Figure 6F:
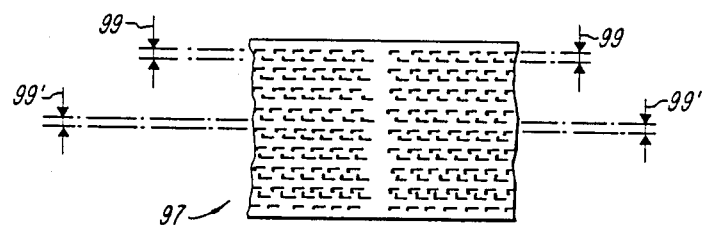
Figure 6D:
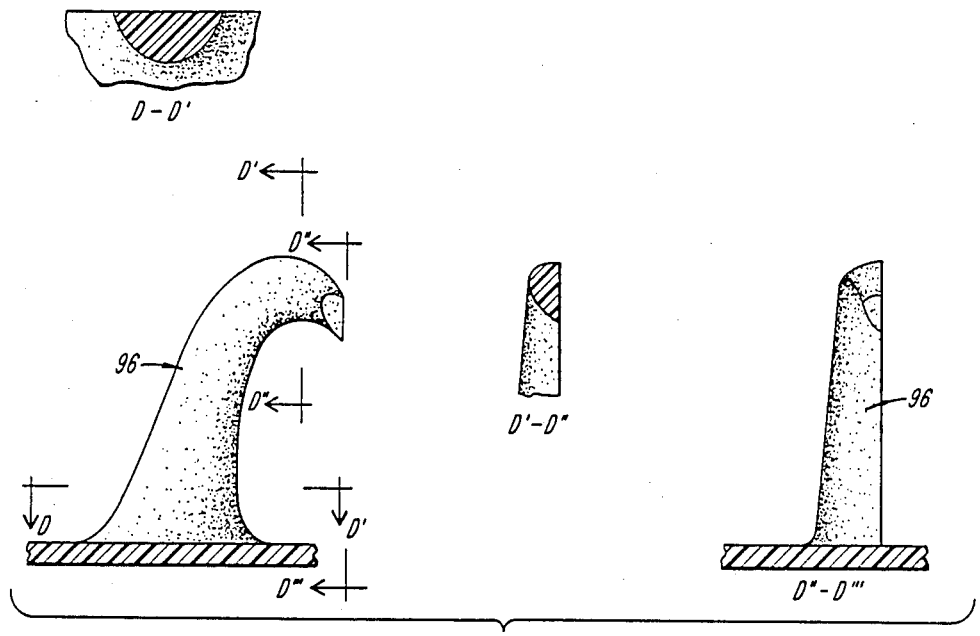

Referring now to FIG. 6D, generally designated at 96 is a perspective view of a hook formed by the embodiment of the molding modules having the engraved recesses solely in the mold plates. Portions of the stems of the hooks 96 have rounded walls, formed by the rounded surfaces of the confronting walls of the engraved cavities, which rounded surfaces are both continuously smooth and free of edges to prevent sticking of the plastic material injected into the several mold cavities and to facilitate release of the hooks during ribbon removal. As illustrated by section D—D', the base of the hook 96 is wider than the tip of the hook as shown by the section D'—D" to provide a thickness sufficient to prevent hook tear-off as the ribbon is being removed from the mold cavity. The hook geometry 96, particularly the differential in thickness along its length, is such that the ends bend more than the stems during separation of fastening elements embodying the hooks, so that the hook geometry 96 is especially advantageous in applications calling for a comparatively low separation frequency.

Figure 6E:
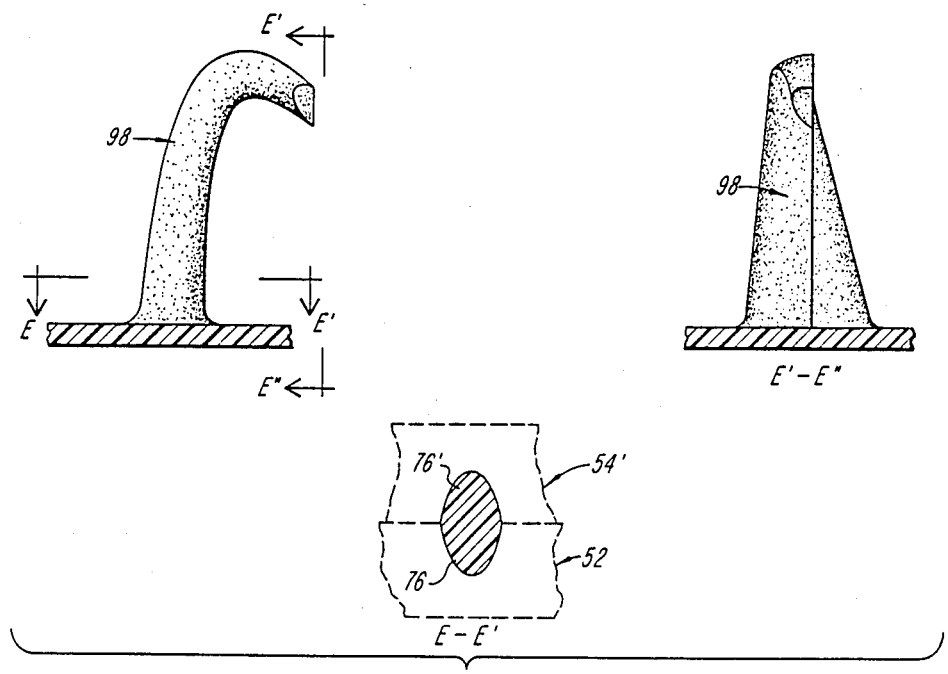

Referring now to FIG. 6E, generally designated at 98 is a perspective view illustrating the hook geometry formed by the embodiment of the molding modules where the mold cavities are co-constituted by the engraved mold cavity recesses together with the spacer plate recesses. The stem of the hook 98 has rounded outer surfaces circumferentially about the hook, which, as in the hook 96, facilitates hook removal from the cavities, by preventing sticking of the plastic material.

The hook 98 is particularly advantageous for separable fasteners intended for use in applications having a comparatively-high number of repeated separations. Because the hook is formed by the mole cavity walls of the cooperative spacer and mold plates, the thickness dimension of each half-hook is able to be reduced with respect to the width dimension, which is sufficient to prevent hook-tearoff during ribbon removal from the molding modules. The hooks 98 thus have a more uniform thickness such that the stem and the end of the hooks more uniformly flex during separation of the hooks from their associated loops, so that the ends do not easily fatigue, which allows for their repeated use while retaining their fastening action.

Referring now to FIG. 6F, generally designated at 97 is a plan view, broken away, illustrating the uniformity of hook-patterns of exemplary as produced ribbon. The interspace designated by arrows 99 between the hooks, of a row of hooks and the interspace designated 99' between adjacent rows of hooks, are substantially identical module-to-module. The uniform hook pattern substantially eases the requirements on downstream ribbon handling machines and instruments. The hook geometry can be varied intra and inter module, among others, to provide different gripping action where desirable.

Referring now to FIGS. 1, 2, 7 and 8, a pair of guide-rails 100 are mounted to either side of the frame 12 and adjacent the injection heads 30 along the two production paths 26, 28. The guide-rails have a narrow taper at their upstream portions 102 adjacent the sprocket wheels 14, 16. The rollers 90, as they are released from the teeth of the sprocket wheels, bear against the tapering upstream portion 102 of the guide-rails 100. As the driven modules are guided therealong, the rollers 90 ride upwardly thereon, the pins 80, 86 are therewith urged upwardly, and the several spacer plates 54 of the modules therewith are moved upwardly relative to the several mold plates 52 thereby closing the several mold cavitites, as best seen in FIG. 2. The upward movement of the spacer plates is bounded by the bearing of the rectangular facets 84, 88 of the pins 80, 86 against the confronting top facet of the rectangular apertures 68 of the sideplates 46 of the molding modules, whereby as best seen in FIG. 2, the molding modules are so limited in spacer plate travel that in the closed condition a generally-planar top surface is presented to the injection head.

Figure 7:
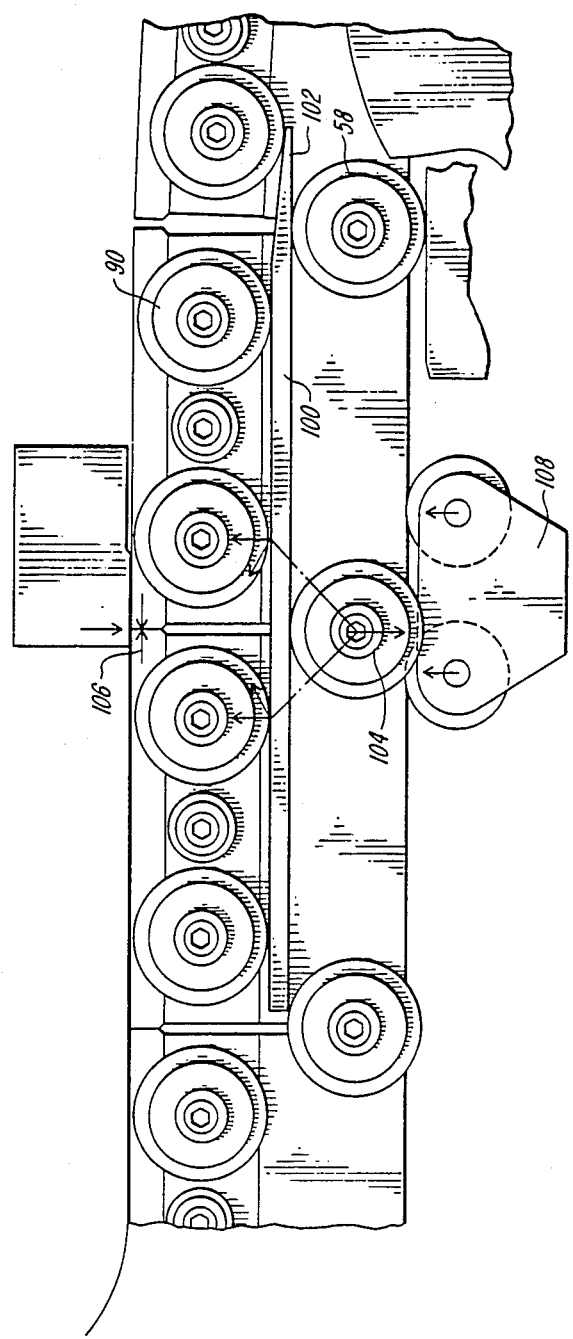
FIG. 7 is a pictorial diagram illustrating first molding module alignment means of the improved machine and method for the continuous production of a separable fastening element according to the present invention.

The rollers 90 ride on one surface of the rail 100, and the rollers 58 roll on the bottom surface of the rail 100, as best seen in FIG. 7. The thickness dimension of the rail at the downstream portion thereof proximate the injection heads is selected to be slightly larger than the radial gap between the rollers 58, 90. The rollers 58 thereby pull-down the molding modules to either side of the injection head as illustrated by an arrow 104, and therewith the modules to either side of the injection head are pivoted slightly towards each other closing the gap at the lateral interface therebetween as shown by arrows 106. In this manner, the first module alignment means holds adjacent modules in a tight-fitting relationship under the injection head, such that the interface between adjacent molding modules is closed and an effectively continuous surface is thereby presented under the injection head. A pair of rollers 108 are pivotally mounted to the frame 12 and are aligned with the injection heads for supporting the confronting bottom surfaces of adjacent modules thereunder. The positioning of rollers 108, to either side of the injection head, further increases the closing force 106, due to the applied injection pressure.

Figure 9A:
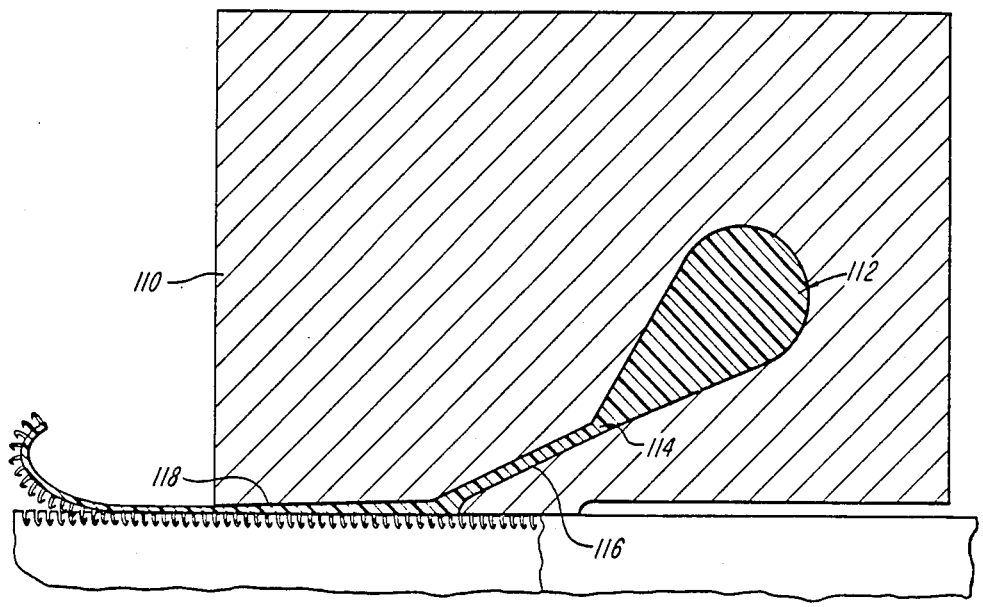
FIGS. 9A, 9B are enlarged pictorial views illustrating the injection head of the improved machine and method for the continuous production of a separable fastening element according to the present invention.
Figure 9B:
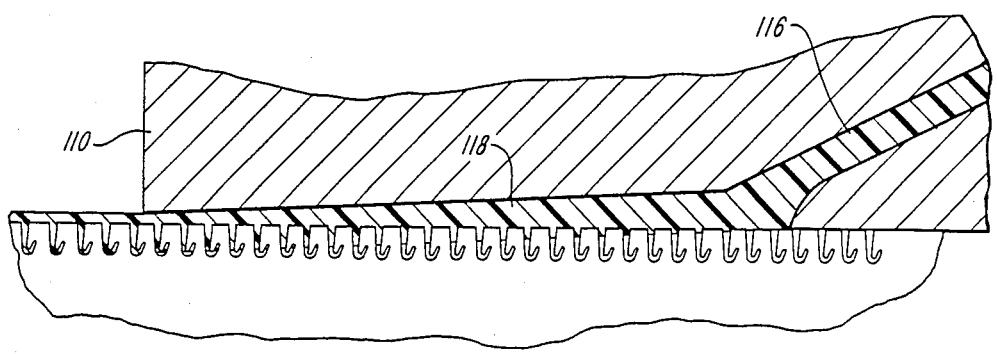

Referring now to FIGS. 2 and 9, each of the injection heads includes a block 110 having an interior, generally funnel-shaped injectant supply chamber generally designated 112 operatively connected to a single pump.

The funnel-shaped supply has an elongated, generally-downwardly-tapering orifice 114. A generally-downwardly-inclined and elongated transition orifice 116 is provided in communication with the nozzle end of the funnel-shaped supply reservoir 112 on one end, that terminates into an injection and forming die 118 on its other end. The die 118 has a cross-section that has a diminishing taper in the direction of motion of the molding modules. The injectant in comparatively-large upstream regions of the injection and forming die 118 into a ribbon-like coating on the smooth, generally-planar exposed surfaces of the molding modules. A portion of the injection in comparatively-small downstream regions of the injection and forming die, is forced, by a wedge-like action of the die 118, into the mold cavities, whereby the pressure requirements on the injectant pump are reduced. The pump, operable at correspondingly lower pressures, has an increased life between malfunction and routine pump replacement, so that substantial maintenance and pump costs savings are realized, and system throughput is proportionately improved.

The separable fastening element thus formed by the injection heads then moves downstream along the production paths 26, 28 of FIG. 1, and as it moves therealong, the material cures, so that by the time it reaches the removal station on each side of the machine, two ribbons of ribbon-like backing material having plural, uniformly-arrayed and integral hook-like projections are available for removal. Forced air or other cooling means may be required to increase output.

Figure 11:
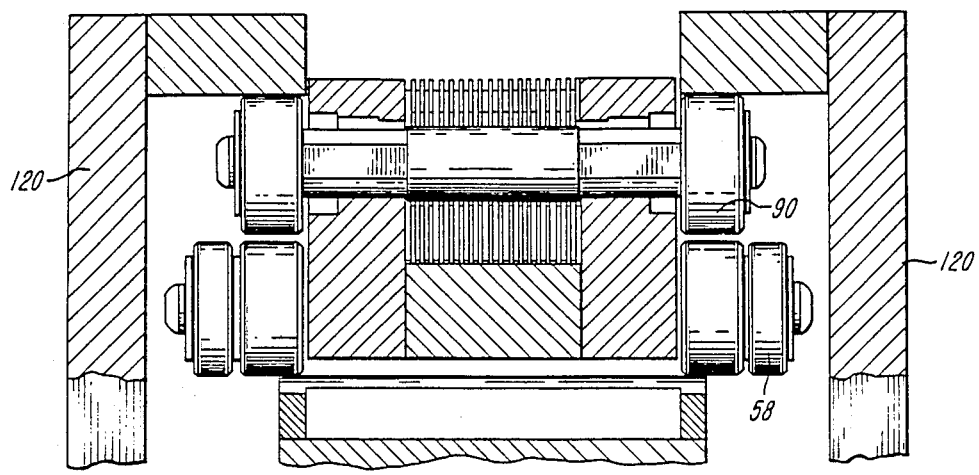
FIG. 11 is a sectional view along the line 11—11 of FIG. 1.
Figure 8:
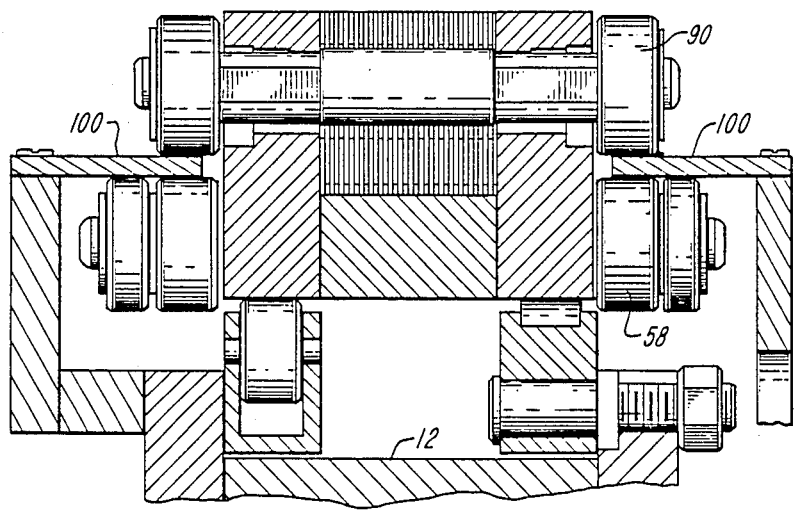
FIG. 8 is a sectional view along the line 8—8 of FIG. 1.
Figure 10:
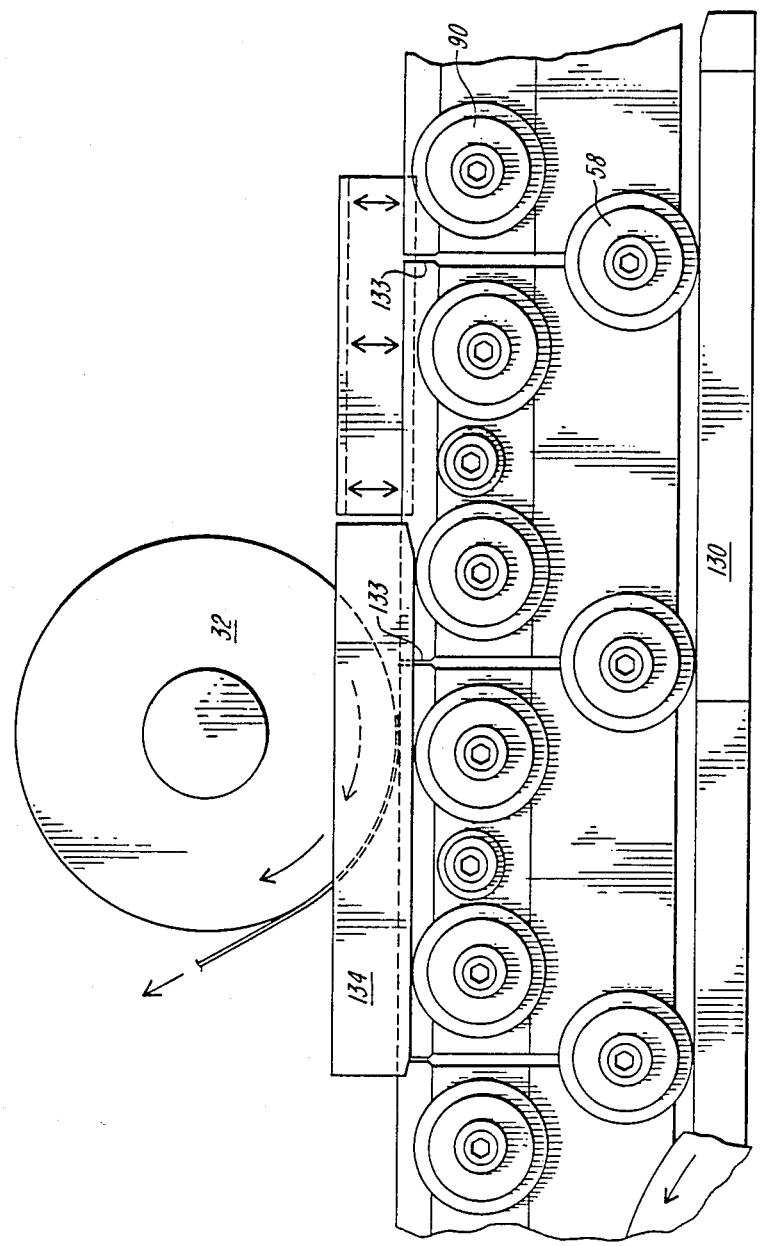
FIG. 10 is a pictorial diagram illustrating a second molding module alignment means of the improved machine and method for the continuous production of a separable fastening element according to the present invention.

Referring now to FIGS. 1, 10 and 11, pull-down arms 120 are provided for sliding the spacer plates relative to the mold plates of the molding modules as they are moved proximate the removal-wheels for releasing the two separable fastening elements along each of the production paths 26, 28. The pull-down arms 120 are mounted on a pair of actuators 124. The actuators 124 have cam followers 126 that follows a cam 131 driven synchronously by the drive motor of the drive sprocket 14. The pull-down arms 120 thus reciprocate in synchronization with the advance of the modules towards the ends of the production paths 26, 28. The wheels 90 of the corresponding molding modules are thereby urged downwardly, and the spacer plates therewith move downwardly as best seen in FIG. 11. The plural hook-like projections are released from the several cavities of each of the mold plates, and the freed ribbon of the separable fastening element is pulled by tension off of the surface of the modules by the removal-wheels 32 on the several production paths.

Pairs of guide-rails 130 are mounted to the frame 12 and positioned along downstream portions of the production paths 26, 28 proximate removal-wheels 32 for aligning the modules in an intended orientation at the time of ribbon removal. The guides 130 having a tapering cross-section that tapers at an increasing amount to a smaller cross-section in the direction of advance of the modules as shown by a line 132 in FIG. 1. The wheels 58 follow the guides 130, and as a result of the increasing downstream taper, the interface defined between adjacent modules is slightly split-apart at times prior to the times of the reciprocal actuation of the pull-down arms 120. The slight separation, as illustrated (exaggerated) at 133 in FIG. 10, prevents frictional wearing engagement of the spacer plates of adjacent modules. Upper guideplates 134 are mounted to the frame 12. The plates 134 cooperate with the plates 130 to further provide proper alignment of the molding modules as they cyclically pass by the removal-wheels 32 along the two ribbon production paths.

Figure 14:
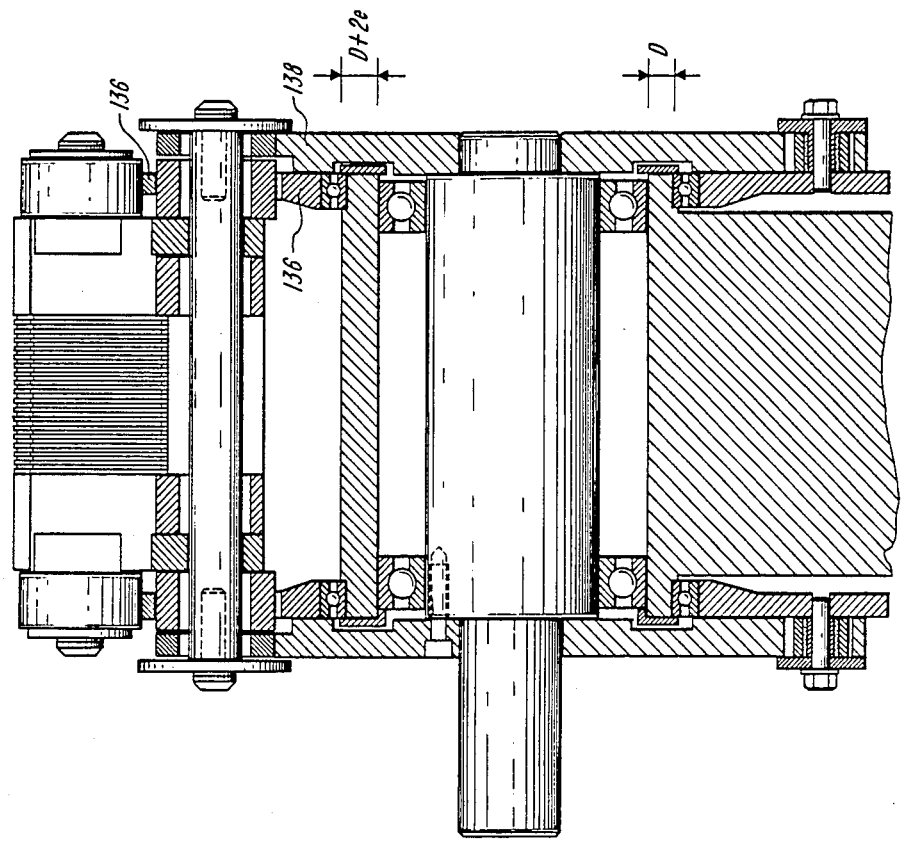
FIG. 14 is a sectional view illustrating the alternate sprocket drive assembly of the improved machine and method for the continuous production of a separable fastening element according to the present invention.
Figure 12:
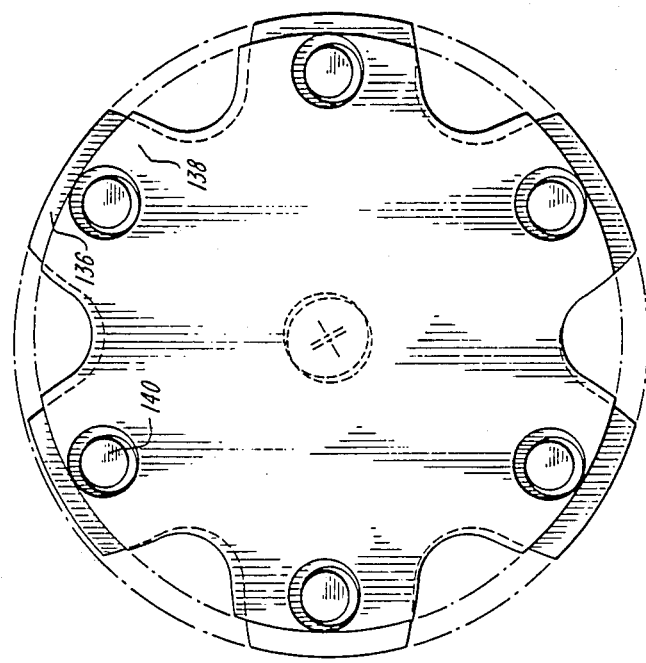
FIG. 12 is a partial elevational view illustrating an alternate sprocket drive embodiment of the improved machine and method for the continuous production of a separable fastening element according to the present invention.
Figure 13:
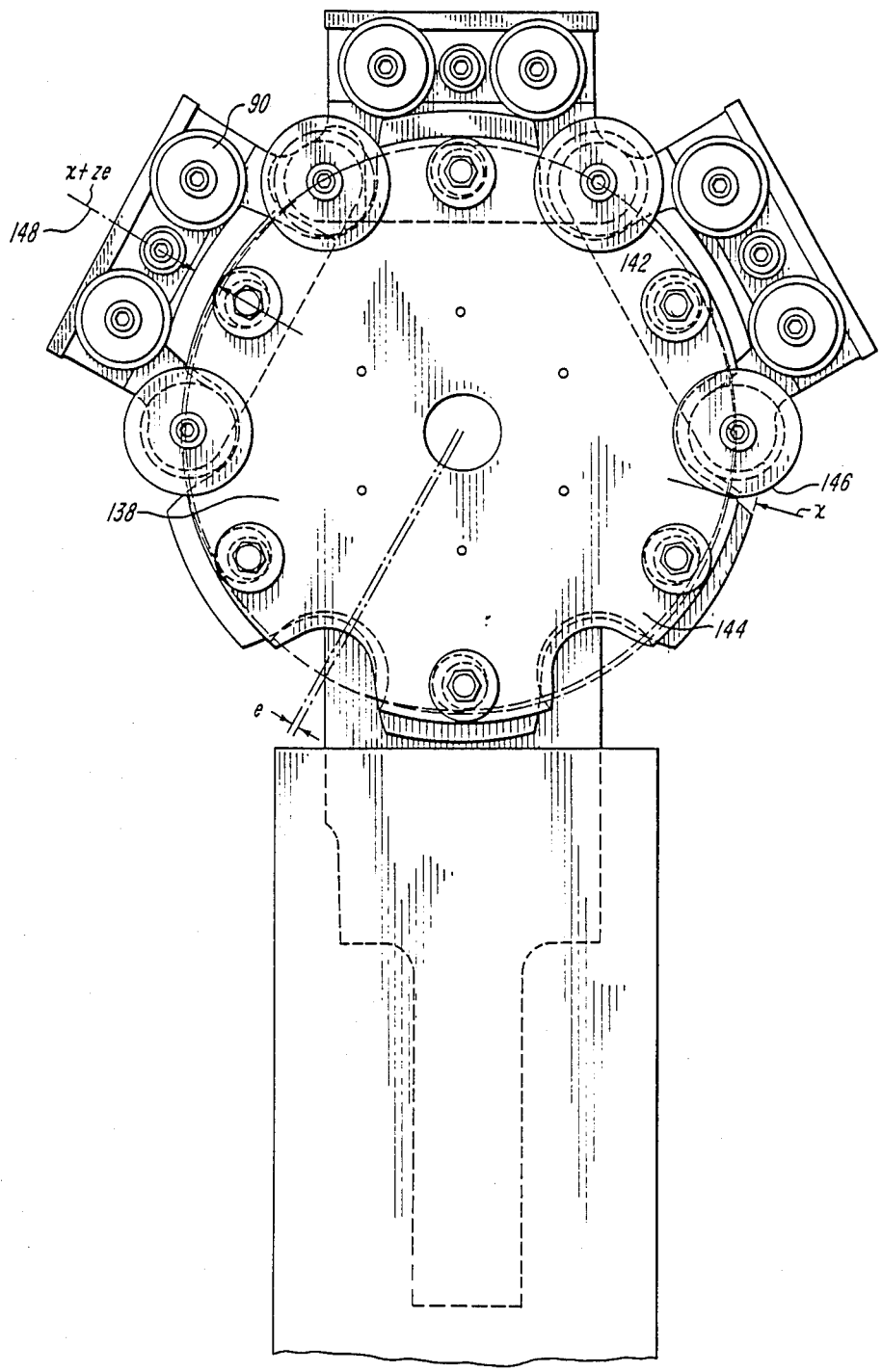
FIG. 13 is a schematic diagram useful in illustrating the operation of the second socket drive embodiment of the improved machine and method for the continuous production of a separable fastening element according to the present invention.

Referring now to FIGS. 12, 13 and 14, generally designated at 136 is an alternate embodiment of the sprocket drive assembly according to the present invention. In the alternate embodiment, a spider 136 is eccentrically mounted interiorly to each of the sprocket wheels 138, as by the six posts 140 illustrated in the preferred embodiment. Because of the eccentric mount, the teeth 142 of the spiders 136 are radially displaced asymmetrically relative to the teeth 144 of the sprockets 138 with angular position, as illustrated by arrows 146 designated "X", and by arrows 148 designated "X+2$e$" in FIG. 13, where "$e$" represents the amount of eccentricity of the spider vis a vis the sprocket. As the modules are released off the sprockets towards the paths 26, 28 (FIG. 1), the eccentric mounting is such that the teeth of the spider bear against and move the wheels 90 of the several molding modules outwardly, which therewith moves the pins and spacer plates outwardly, such that the spacer plates of the molding modules are moved into the closed condition. In this embodiment, the guide rail portions 102 have primarily a positioning and aligning function, insofar as the closure of the spacer plates has already been accomplished by action of the eccentric spider, substantially as described above.

The improved machine and method for the continuous production of a separable fastening element of the present invention as should now be readily apparent makes possible the quite economical manufacture of double ribbons of separable fastening element in a single machine. The several cooperative molding modules have generally-rectangular constitutive mold and spacer plates, that are comparatively-easy to manufacture. The relative position of the mold plates and of the spacer plates in adjacent molding modules are the same, and hook-like projections on the produced ribbons are uniform along the length of the ribbons. The machining tolerances on the thickness dimension of the constitutive plates is materially reduced so that the selection of different-thickness module plates in the same, in adjacent, or in selectively spaced modules is possible. In this way for example, a portion of the produced ribbon can have a one sixteenth inch center-to-center hook spacing, while another portion of the same ribbon can have a one eighth inch center-to-center hook spacing, whereby across the width of a formed ribbon, different gripping power can be selectively provided. In addition, the machine can be scaled at economic costs roughly proportional to the scale change, where desired, to provide three or more ribbons simultaneously.

Other advantages and features of the instant invention will become apparent to those skilled in the art without departing from the scope of the appended claims.

What is claimed is:

1. A machine capable of continuously producing ribbons of separable fastening element having a backing and upstanding resilient hooks integral therewith, well suited for high separation frequency applications, comprising:
   an elongated frame;
   plural molding modules having open and closed conditions;
   said modules each being of an identical construction and each including plural interdigited mold and spacer plates in alternating side by side relation, the mold and spacer plates having edges that terminate in common planes on each side of the module;

means for mounting said plural modules in adjacent relation to said elongated frame for circulation about a closed path such that the edges of the mold plates and the edges of the spacer plates of adjacent modules are non-overlapping;

means comparative with said mounting means for circulating said plural modules controllably about said closed-path;

said plural mold and spacer plates of each of said modules having a generally-rectangular shape;

at least one of the mold plates having plural mold cavities formed into at least one side of the mold plate in spaced-apart relation along a top edge thereof;

at least one of the spacer plates having plural spacer cavities formed along at least one side thereof and spaced apart along the top edge;

the mold cavities having rounded quick-release walls and the spacer cavities having rounded quick-release walls that are cooperative to co-constitute hook forming cavities as confronting pairs of spacer cavities and mold cavities, the mold cavities and the spacer cavities being further cooperative to provide a selectivity uniform hook cross-section along the dimension of elongation of the hooks.

2. A high through-put machine for continuously producing first and second ribbons of a separable fastening element having a backing and hooks integral with and upstanding off of the backing, comprising:

an elongated frame member;

plural injection molding modules each including molding cavities that have an open and a closed condition in which the hooks are formed and each defining a molding surface open to the molding cavities thereof upon which the backings of the ribbons are formed;

means coupled to said frame and to said plural modules for connecting and supporting said modules in adjacent relation about such a generally-closed path that at least two linearly-extending ribbon production regions having preselected lengths are defined about said closed path the lengths of the regions being long enough to allow the ribbons to cure;

means cooperative with said connecting and supporting means and coupled to said frame for circulating said plural modules about said closed-path in a cyclic manner;

first and second injection heads mounted to and stationary with respect to said frame and respectively at upstream portions of said first and said second linearly extending production regions as said modules circulate about said closed path;

means cooperative with said circulating means for closing said cavities of said modules by the time the modules are circulated proximate the injection heads along each of the linearly-extending ribbon production regions;

means cooperative with said circulating means for urging adjacent modules together in such a way that the mold surfaces of adjacent modules are effectively continuous and gapless module-to-module proximate the injection heads along each of the linearly-extending ribbon production regions so that the backings of the first and second ribbons respectively produced therealong are continuously formable;

first and second removal means mounted to said frame respectively at downstream portions of said first and second linearly-extending production regions;

means cooperative with said circulating means for slightly separating adjacent modules in the modules are circulated within the removal means along each of the linearly-extending ribbon production regions;

said first and second removal means cooperative with said circulating means for opening said cavities of said modules as the modules are circulated downstream of the production regions to release the hooks out of the hook forming cavities.

3. The machine of claim 2, wherein each of said modules includes plural spacer and mold plates, and wherein said closing means includes cooperative cams and cam followers mounted to the plural modules and to the region of said frame proximate said first and second injection heads for moving said spacer plates relative to said mold plates.

4. The machine of claim 2, wherein said separating means includes cooperative cams and cam followers mounted to the modules and to the frame in the region of said frame proximate said removal means.

5. A machine capable of continuously producing differential sticking power ribbons of separable fastening element, comprising:

an elongated frame;

plural molding modules having open and closed conditions;

said modules each being of an identical construction and each including plural mold and spacer plates in alternating side by side relation, the mold and spacer plates having edges that terminate in common planes on each side of the modules;

means for mounting said plural modules in adjacent relation to said elongated frame for circulation about a closed-path, with the mold and the spacer plates in adjacent modules occupying the same relative position such that the edges of mold plates of adjacent modules confront each other and the edges of spacer plates in adjacent modules confront each other without overlapping;

means cooperative with said mounting means for circulating said plural modules controllably about said closed-path;

said plural mold and spacer plates of each of said modules having a generally-rectangular shape;

said mold plates having first apertures provided therethrough, and said spacer plates having second apertures provided therethrough;

first and second locking pins slidably received through corresponding ones of said first and second apertures of said plural mold and spacer plates of each of said modules in such a way that the ends of the pins extend beyond the mold and spacer plates thereof;

the pins and the apertures have preselected dimensions selected so that the pins closely fit within the second apertures of the mold plates while they are free to move within the first apertures of the mold plates; and means coupled to the extending ends of the first and second locking pins for displacing the pins and therewith the spacer plates by abutment therewith so that the spacer plates move relative to the plural mold plates in each of the molding units to select between the modules open and closed conditions.

6. The machine of claim 5, wherein each of the molding modules further includes spaced side plates interspaced by a bottom cross plate defining a cavity into which the several mold and spacer plates constitutive of each molding module are received.

7. The machine of claim 5, further including third pins, and wherein each of the mold plates includes a third aperture that cooperates with a respective one of said third pins to provide X, Y positioning of the several plates.

8. The machine of claim 5, wherein one of the spacer plates second apertures and the corresponding pin are so shaped and dimensioned that the spacer plates are allowed to thermally expand in one direction while preventing such movement in a direction perpendicular thereto.

9. A machine for the continuous production of a separable fastening element having a backing member and integral upstanding hook-like formations, comprising:
   an elongated frame;
   plural modules each including a molding cavity having an open condition and a closed condition and a molding surface;
   means for connecting and supporting said plural modules in adjacent relation to said frame about an endless-path;
   means for so driving said plural modules about said endless-path cyclically that the molding surfaces of adjacent modules are effectively continuous and gapless module-to-module for at least a portion of travel along the endless path;
   an injection head mounted to and stationary with respect to said frame confronting said portion where said modules are effectively continuous;
   said injection head including a nozzle, an injectant material pump coupled thereto, and an injection and forming die coupled to said nozzle;
   said die having a first and a second die cavity in communication with each other and in side-to-side relation that are both open to the molding surfaces of the modules, the first cavity having a first shape selected to first allow forming plastic injectant material into the backing member and the second cavity having a shape selected to thereafter force a portion of the backing member into the molding cavities of the modules as the modules travel along the endless path first past said first cavity and thereafter part said second cavity;
   whereby, the injectant material pump and the action of the injection and forming die cooperate to inject the injectant material into the mold cavities so that the injection and forming die relieves the pump and to this extend reduces what would otherwise be higher required injectant material pump pressures which therewith results in a correspondingly-increased lifetime of pump operation.

10. The machine of claim 9, wherein said injection head includes a block having a funnel-shaped fluid reservoir, an elongated and generally downwardly inclined transition orifice in communication on one end with said fluid reservoir and on another end with said injection and forming die.

11. A high through-put machine for continuously producing at least one continuous ribbon of a separable fastening element having a backing and hooks integral therewith and upstanding off of the backing, comprising:
   an elongated frame member;
   plural injection molding modules each including molding cavities that have an open and a closed condition in which the hooks are formed and each defining a molding surface open to the molding cavities thereof upon which the backing of the at least one ribbon is formed;
   means coupled to said frame and to said plural modules for connecting and supporting said modules in adjacent relation about such a generally-closed path that at least one linearly-extending ribbon production region having a preselected length is defined about said closed path, the length of the region being long enough to allow the ribbon to cure;
   means cooperative with said connecting and supporting means and coupled to said frame for circulating said plural modules about said closed-path in a cyclic manner;
   an injection head mounted to and stationary with respect to said frame and respectively at an upstream portion of said linear production region as said modules circulate about said closed-path;
   means cooperative with said circulating means for closing said cavities of said modules by the time the modules are circulated proximate said injection head along said linearly-extended ribbon production region;
   means cooperative with said circulating means for urging adjacent modules together in such a way that the molding surfaces of adjacent modules are effectively continuous and gapless module-to-module proximate the injection head along said linearly-extending ribbon production region so that the backing of the ribbon is continuously formable;
   first removal means mounted to said frame and respectively at a downstream portion of said linear production region;
   means cooperating with said circulating means for slightly separating adjacent modules just before each module is circulated to the first removal means;
   said first removal means cooperative with said circulating means for opening said cavities of said slightly separated modules to release the hooks out of the hook forming cavities.

12. A machine capable of continuously producing differential sticking power ribbons of separable fastening element, comprising:
   an elongated frame;
   plural molding modules having open and closed conditions;
   said modules each being of an identical construction and each including plural interdigited mold and spacer plates alternating in side by side relation, the mold and spacer plates having edges that terminate in common planes on each side of the modules;
   means for mounting said plural modules in adjacent relation to said elongated frame for circulation about a closed-path such that the edges of the mold plates of adjacent modules confront each other and the edges of spacer plates confront each other in adjacent modules without overlapping;

means cooperative with said mounting means for circulating said plural modules controllably about said closed-path;

said plural mold and spacer plates of each of said modules having a generally-rectangular shape;

said mold plates having first apertures provided therethrough, and said spacer plates having second apertures provided therethrough;

first and second locking pins slidably received through corresponding ones of said first and second apertures of said plural mold and spacer plates of each of said modules in such a way that the ends of the pins extend beyond the mold and spacer plates thereof;

the pins and the apertures have preselected dimensions selected so that the pins closely fit within the second apertures of the mold plates while they are free to move within the first apertures of the mold plates; and means coupled to the extending ends of the first and second locking pins for displacing the pins and therewith the spacer plates by abutment therewith so that the spacer plates move relative to the plural mold plates in each of the molding units to select between the modules open and closed conditions.

13. The machine of claim 12, wherein the confronting walls of the spacer and mold plates are provided with cavities that co-constitute each one of plural hook-like forming formations.

14. The invention of claim 12, wherein the relative position of the mold and spacer plates in adjacent modules is different.

15. The machine of claim 12, wherein the thickness of the mold and of the spacer plates in different modules is different.

* * * * *